United States Patent [19]

Catena et al.

[11] Patent Number: 5,268,406
[45] Date of Patent: Dec. 7, 1993

[54] SHELLAC/POLYALKYLENEGLYCOL MONOMETHACRYLATE GRAFT COPOLYMERS

[75] Inventors: Robert J. Catena, Orange; Mathew C. Mathew, Bloomfield; Arnold Gruben, Cedar Grove, all of N.J.

[73] Assignee: Sun Chemical Corporation, Fort Lee, N.J.

[21] Appl. No.: 862,098

[22] Filed: Apr. 2, 1992

[51] Int. Cl.⁵ .................. C09F 1/04; C08F 242/00; C08H 5/00; C09D 151/00

[52] U.S. Cl. .................. 524/389; 530/201; 527/600; 525/54.41

[58] Field of Search .......... 527/600; 530/201; 524/389; 525/54.41

[56] References Cited

U.S. PATENT DOCUMENTS

| | | | |
|---|---|---|---|
| 3,505,268 | 4/1970 | Backhouse et al. | 525/54.41 |
| 3,808,036 | 4/1974 | Zdanowski | 524/400 |
| 3,926,893 | 12/1975 | Woodward | 524/276 |
| 4,168,255 | 9/1979 | Lewis et al. | 524/340 |
| 4,870,139 | 9/1989 | Kveglis et al. | 525/420.5 |
| 4,894,433 | 1/1990 | Bornack, Jr. | 528/272 |
| 4,980,408 | 12/1990 | Chan | 524/504 |

OTHER PUBLICATIONS

Allcock et al. "Contemporary Polymer Chemistry" pp. 203–204 (1981), Prentice-Hall, Inc., N.J.
"Hawley's Condensed Chemical Dictionary" p. 1232 Van Nostrand, 1987.

*Primary Examiner*—Morton Foelak
*Assistant Examiner*—Jeffrey Culpeper Mullis
*Attorney, Agent, or Firm*—Jack Matalon

[57] ABSTRACT

Novel graft copolymers of shellac and a polyalkyleneglycol monomethacrylate are prepared. These graft copolymers are useful in preparing water-based flexographic, i.e. packaging laminating inks, comprised of a pigment; the graft copolymer; a binder resin; an alkanol; an alkali, ammonia or an amine; and water.

23 Claims, No Drawings

SHELLAC/POLYALKYLENEGLYCOL MONOMETHACRYLATE GRAFT COPOLYMERS

FIELD OF THE INVENTION

The present invention relates to novel graft copolymers of shellac and polyalkyleneglycol monomethacrylates and their use in water-based flexographic, i.e. packaging laminating, inks.

BACKGROUND OF THE INVENTION

The use of shellac in water-based flexographic inks is well known. However, such inks have several disadvantages, notably marginally acceptable bond strength and undesirably high viscosities. Moreover, as inks are used, there is a buildup of ink on the press cylinders and shellac-based inks are difficult to remove from the cylinders, even with alkaline cleaning solutions.

Acrylic resins on the other hand can be made water-dispersible, but are generally incompatible with shellac and do not offer the advantages of shellac such as adhesion, gloss and printability.

Ideally, a copolymer of these two incompatible polymers would be very useful for preparing water-based inks, but such copolymers have not been produced to date.

BRIEF DESCRIPTION OF THE INVENTION

Polyalkyleneglycol monomethacrylate monomers are grafted onto shellac resulting in graft copolymers that retain the desirable properties of each component. The process for preparing the graft copolymers involves reacting the desired polyalkyleneglycol monomethacrylate monomer with shellac together with an alkali, ammonia or an amine in an alkanol solvent with a free radical peroxidic initiator to obtain an alcohol solution of the graft copolymer. The alkanol solution may then be mixed with the desired pigment, binder resin, additional alkali, ammonia or amine, additional alkanol and diluted with water to the desired tinctorial strength.

Alternatively, if it is desired to produce an alkanol-free ink, the shellac may be solubilized with ammoniacal water to a pH of 8-9 at 50° C. and separately adding the desired polyalkyleneglycol monomethacrylate monomer and a free radical peroxidic initiator such as 0.25-0.50 wt. % ammonium persulfate. The resultant copolymer solution may then be mixed with pigment, binder resin, additional alkali, ammonia or amine and diluted with water to the desired tinctorial strength to thereby produce a water-based ink containing no alkanol.

DETAILED DESCRIPTION OF THE INVENTION

The Shellac

Shellac is the flaked form of purified lac. It typically has an acid value of 65-80, a hydroxyl value of 260-280 and an iodine value of 15-25. It has a melting point range of 75°-85° C., a relative density of 1.15-1.20 and a water content of 2-16%. The addition of an alkali, ammonia or an amine produces a salt which renders it water soluble. For the purposes of the present invention, it is desirable that the shellac be of a pure grade, bleached and wax-free.

The principal components of shellac are shelloic acid present in an amount of about 27% and aleuritic acid, present in an amount of about 46%; the balance is attributed to kerrolic acid (5%), butolic acid (1%), wax esters (2%), neutral compounds of unknown composition (7%), and polybasic esters of unknown composition (12%).

The formulas of shelloic acid and aleuritic acid are:

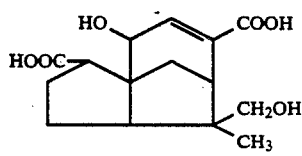

Shelloic Acid

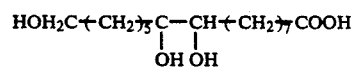

Aleuritic Acid

The Polyalkyleneglycol Monomethacrylate

The polyalkyleneglycol monomethacrylate monomers useful for preparing the novel copolymers of the present invention are commercially available. Typically, such monomers will have number average molecular weights in the range of about 300 to 1000. The preferred monomers for use in the present invention are those in which the alkylene moiety contains 2 to 8 carbon atoms; particularly preferred monomers are polyethyleneglycol monomethacrylate and polypropyleneglycol monomethacrylate.

The Graft Copolymer

The shellac/polyalkyleneglycol monomethacrylate copolymers of the present invention will typically have a number average molecular weight in the range of about 600 to 15,000; for use in preparing packaging laminating inks, it is preferred that the copolymer be one having a number average molecular weight in the range of 6,000 to 12,000.

The idealized structures of copolymers of shelloic acid and aleuritic acid with polyethyleneglycol monomethacrylate having a number average molecular weight of about 600 when n is equal to 5 as follows:

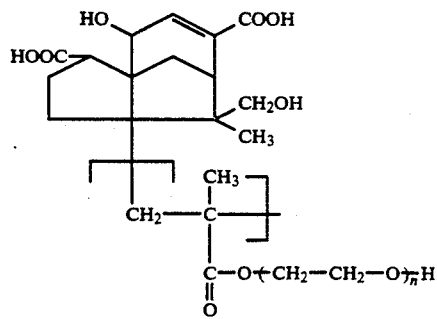

Shelloic Acid Copolymer

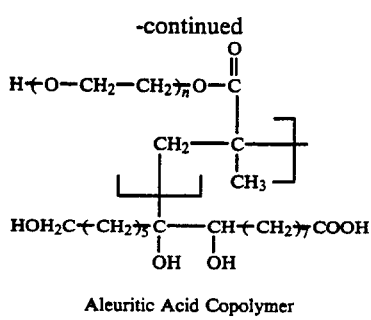

Aleuritic Acid Copolymer n = 5-20

Process for Preparation of the Copolymer

A refined, wax-free, vacuum-dried grade of shellac is combined with an alkanol, e.g. n-propanol, the polyalkyleneglycol monomethacrylate, and a free radical peroxidic initiator such as t-butyl peroctoate. The reaction mixture is refluxed (e.g. at 80°-100° C., depending on the alkanol) for 1-5 hours. The resultant copolymer solution will have a viscosity of 50 to 100 poises at 55-65% solids as measured on a Brookfield viscometer at room temperature.

The ratio of shellac to the monomethacrylate monomer will typically be in the range of about 60:40 to 95:5 parts by weight, preferably 70:30 to 80:20 parts by weight. Other alkanols besides n-propanol may be used, particularly if they are water soluble and have a boiling point in the preferred range of 80°-100° C. The alkanol, if used, will typically be present in an amount of 35 to 50 wt %, based on the weight of the reaction mixture. If an alkanol-free laminating ink is desired, the copolymer may be prepared in the absence of the alkanol, as indicated above.

Other useful free radical peroxidic initiators include acyl peroxides, dialkyl peroxides, peroxy esters, hydroperoxides, and the like; the peroxidic initiator will be present in an amount of about 2 to 8 wt. %, based on the weight of the monomethacrylate monomer.

Water-Based Flexographic Printing Ink

The water-based flexographic printing ink may be readily prepared from the following components:
A. the graft copolymer of shellac and a polyalkyleneglycol monomethacrylate of the present invention;
B. a pigment;
C. a resin;
D. an alkanol;
E. an alkali, ammonia or an amine; and
F. water.

The pigment is typically present in an amount of about 5 to 65 wt. %, preferably 10 to 50 wt. %, based on the weight of the ink. Suitable pigments include, e.g. titanium dioxide, Red Lake C, Cyan Blue, Diarylide Yellow, Diarylide Orange, Bon Red, Cyan Green, carbon black, etc.

The ink also will contain a resin in addition to the graft copolymer of the present invention. The resin is typically present in an amount of about 2 to 8 wt. %, based on the weight of the ink. Suitable resins include rosin-modified fumaric resins, rosin-maleic resins, copal resins and acrylic resins having acid values of at least about 200. The preferred resins are the rosin-modified fumaric resins; these resins typically have acid values of 250-330 mg KOH/G and softening points of 140°-150° C.

The alkanol is typically employed in an amount of about 5 to 15 wt. %, based on the weight of the ink; suitable alkanols include n-propanol, isopropanol, t-butanol, etc.

The alkali, ammonia or amine is employed in an amount sufficient to adjust the pH of the ink to 8-9.5. Preferably, ammoniacal water containing 28 wt. % NH$_3$, is employed in an amount of about 2-5 wt. %, based on the weight of the ink.

If desired, the usual flexographic ink adjuvants, e.g. waxes, surfactants, anti-foaming agents, biocides, etc. may also be incorporated in the ink formulation.

The flexographic ink is readily prepared in the following manner: An aqueous varnish is prepared by dissolving the graft copolymer (usually already in solution) and selected resin in the water, n-propanol and ammonia. The pigment is then dispersed in a portion of the varnish by conventional ball milling or shot milling techniques. The dispersion is then blended with the remainder of the varnish together with such other adjuvants as may be desired.

The following nonlimiting examples shall serve to illustrate the invention.

EXAMPLE 1

160.0 parts of a refined, wax-free, vacuum-dried shellac and 114.2 parts of n-propanol were charged into a 4-neck 1-liter round bottom flask equipped with a nitrogen blanket, thermometer, mechanical agitator and reflux condenser. The contents were constantly agitated and heated slowly to reflux. Reflux was maintained for 30 minutes at which time a premix solution was added over a period of 1 hour. This premix solution consisted of 40.0 parts of a polyethyleneglycol monomethacrylate monomer having a number average molecular weight of 306, 20.0 parts of n-propanol and 1.32 parts of t-butylperoctoate. The solution was then held at 97°-99° C. until a solids content of 60±2% was obtained. The product was cooled to 50° C. and discharged. The resultant copolymer had a viscosity of 57.0 poise at 60% solids measured at 25° C.

EXAMPLE 2

The procedure of Example 1 was followed except that polypropyleneglycol momomethacrylate monomer having a number average molecular weight of 400 was substituted for the polyethyleneglycol monomethacrylate monomer. The results were comparable to that of Example 1.

EXAMPLE 3

A flexographic ink was prepared using the graft copolymer solution resulting from Example 1 and the general procedure outlined above for preparing the ink. The composition of this ink was as follows:

| Component | Parts |
| --- | --- |
| Graft Copolymer Solution of Example 1 | 14.70 |
| Rosin-modified fumaric Resin | 3.80 |
| Titanium Dioxide | 40.00 |
| Water | 28.30 |
| n-Propanol | 8.00 |
| Ammonium Hydroxide (26° Baume) | 3.00 |
| Polyethylene Wax | 2.00 |
| Hydrocarbon-based Defoamer | 0.20 |
| | 100.00 |

The ink of Example 3 exhibited excellent printability, crinkle resistance, block resistance, water resistance and extrusion bond strength when imprinted on polypropylene films.

EXAMPLE 4

Example 3 was repeated substituting 11.76 parts of shellac and 2.94 parts of a polyethyleneglycol having a number average molecular weight of 600. The resultant ink exhibited poor flow, printability, extrusion bond strength and crinkle resistance when imprinted on polypropylene films.

EXAMPLE 5

Example 4 was repeated substituting water for the polyethyleneglycol. The resultant ink exhibited poor flow, printability, extrusion bond strength and crinkle resistance when imprinted on polypropylene films.

EXAMPLE 6

Example 3 was repeated using the following components:

| Component | Parts |
| --- | --- |
| Graft Copolymer Solution of Example 1 | 10.65 |
| Rosin-modified fumaric Resin | 5.00 |
| Phthalocyanine Blue | 19.00 |
| Water | 49.35 |
| n-Propanol | 13.00 |
| Ammonium Hydroxide (26° Baume) | 3.00 |
| | 100.00 |

The ink of Example 6 exhibited excellent printability, crinkle resistance, block resistance, water resistance and extrusion bond strength when imprinted on polypropylene films.

EXAMPLE 7

Example 6 was repeated substituting 8.55 parts of shellac and 2.10 parts of a polyethyleneglycol having a number average molecular weight of 600. The resultant ink exhibited poor flow printability, extrusion bond strength and crinkle resistance when imprinted on polypropylene films.

EXAMPLE 8

Example 3 was repeated using the following components:

| Component | Parts |
| --- | --- |
| Graft Copolymer Solution of Example 1 | 10.50 |
| Rosin-modified fumaric Resin | 5.00 |
| Barium Lithol Red | 21.00 |
| Water | 49.00 |
| n-Propanol | 11.50 |
| Ammonium Hydroxide (26° Baume) | 3.00 |
| | 100.00 |

The ink of Example 9 exhibited excellent printability, crinkle resistance, block resistance, water resistance and extrusion bond strength when imprinted on polypropylene films.

Example 9 was repeated using the following components:

| Component | Parts |
| --- | --- |
| Shellac | 8.40 |
| Polyethyleneglycol, mol. wt. 600 | 2.10 |
| Rosin-modified fumaric Resin | 5.00 |
| Barium Lithol Red | 21.00 |
| Water | 49.00 |
| n-Propanol | 11.50 |
| Ammonium Hydroxide (26° Baume) | 3.00 |
| | 100.00 |

The resultant ink exhibited poor flow, printability, extrusion bond strength and crinkle resistance when imprinted on polypropylene films.

EXAMPLE 10

Example 9 was repeated substituting water for the polyethyleneglycol. The resultant ink exhibited poor flow, printability, extrusion bond strength and crinkle resistance when imprinted on polypropylene films.

What is claimed is:

1. A graft copolymer comprising a polyalkyleneglycol monomethacrylate grafted onto shellac prepared by heating a reaction mixture comprising the monomethacrylate, shellac and a free radical peroxydic initiator selected from the group consisting of acyl peroxides, dialkyl peroxides, peroxy esters and hydroperoxides.

2. The graft copolymer of claim 1 wherein the alkylene group contains 2 to 8 carbon atoms.

3. The graft copolymer of claim 2 wherein the alkylene group is ethylene.

4. The graft copolymer of claim 2 wherein the alkylene group is propylene.

5. The graft copolymer of claim 1 having a number average molecular weight about 600 to 15,000.

6. The graft copolymer of claim 1 wherein the ratio of shellac to polyalkyleneglycol monomethacrylate is about 60:40 to 95:5.

7. The copolymer of claim 1 wherein the reaction mixture includes a water-soluble alkanol having a boiling point in the range of 80°-100° C.

8. The copolymer of claim 1 wherein the peroxydic initiator comprises t-butylperoctoate.

9. A water-based ink comprising:
   A. A graft copolymer comprising a polyalkyleneglycol monomethacrylate grafted onto shellac prepared by heating a reaction mixture comprising the monomethacrylate, shellac and a free radical peroxydic initiator selected from the group consisting of acyl peroxides, dialkyl peroxides, peroxy esters and hydroperoxides;
   B. a pigment;
   C. a resin;
   D. an alkanol selected from the group consisting of n-propanol, isopropanol and t-butanol;
   E. an alkali, ammonia or an amine; and
   F. water.

10. The ink of claim 9 wherein the alkylene group contains 2 to 8 carbon atoms.

11. The ink of claim 10 wherein the alkylene group is ethylene.

12. The ink of claim 10 wherein the alkylene group is propylene.

13. The ink of claim 9 wherein the graft copolymer has a number average molecular weight about 600 to 15,000.

14. The ink of claim 9 wherein the ratio of shellac to polyalkyleneglycol monomethacrylate is about 60:40 to 95:5.

15. The ink of claim 9 wherein the pigment is present in an amount of about 5 to 65 wt. %, based on the weight of the ink.

16. The ink of claim 9 wherein the copolymer is present in an amount of about 5 to 15 wt. %, based on the weight of the ink.

17. The ink of claim 9 wherein the resin is present in an amount of about 2 to 8 wt. %, based on the weight of the ink.

18. The ink of claim 9 wherein the resin is selected from the group consisting of rosin-modified fumaric resins, rosin-maleic resins, copal resins and acrylic resins having acid values of about 200–330 mg KOH/g.

19. The ink of claim 9 wherein the alkanol is present in an amount of 5 to 15 wt. %, based on the weight of the ink.

20. The ink of claim 9 wherein ammonia is present in an amount of about 2 to 5 wt. %, based on the weight of the ink.

21. The ink of claim 9 wherein the water is present in an amount of about 30 to 50 wt. %, based on the weight of the ink.

22. The copolymer of claim 9 wherein the reaction mixture includes a water-soluble alkanol having a boiling point in the range of 80°–100° C.

23. The copolymer of claim 9 wherein the peroxydic initiator comprises t-butylperoctoate.

* * * * *